United States Patent
Räisänen et al.

(10) Patent No.: US 7,274,714 B2
(45) Date of Patent: Sep. 25, 2007

(54) EMULATING OF INFORMATION FLOW

(75) Inventors: Vilho I. Räisänen, Vantaa (FI); Pekka Pessi, Helsinki (FI)

(73) Assignee: Nokia Corporation, Espoo (FI)

( * ) Notice: Subject to any disclaimer, the term of this patent is extended or adjusted under 35 U.S.C. 154(b) by 1014 days.

(21) Appl. No.: 10/204,107

(22) PCT Filed: Jan. 15, 2001

(86) PCT No.: PCT/FI01/00033

§ 371 (c)(1),
(2), (4) Date: Oct. 22, 2002

(87) PCT Pub. No.: WO01/59981

PCT Pub. Date: Aug. 16, 2001

(65) Prior Publication Data

US 2003/0108033 A1    Jun. 12, 2003

(30) Foreign Application Priority Data

Feb. 14, 2000    (FI) .................................. 20000316

(51) Int. Cl.
*H04J 3/06* (2006.01)
(52) U.S. Cl. ...................... 370/510; 370/508; 370/509; 370/394
(58) Field of Classification Search ................ 370/241, 370/248, 249, 394, 395.1, 395.62, 428, 508, 370/509, 510, 429; 375/224–228; 379/1.01, 379/1.03, 10.01–10.02, 15.01, 22.01, 26.02, 379/27.01; 714/703, 736, 742
See application file for complete search history.

(56) References Cited

U.S. PATENT DOCUMENTS 5,450,394 A     9/1995   Gruber et al. ................ 370/17

(Continued)

FOREIGN PATENT DOCUMENTS

EP          0910194           4/1999

(Continued)

OTHER PUBLICATIONS

"A Method of Service Quality Estimation with a Network Measurement Tool", O. Maeshima et al, 1999 *IEEE Int'l Performance, Computing and Communication Conference Proceeding—IPCCC '99*, Scottsdale AZ USA Feb 10-12, 1999, pp. 201-209.

(Continued)

*Primary Examiner*—Wing Chan
*Assistant Examiner*—Mark A. Mais (57) ABSTRACT

The object of the invention is a method for emulating the two-way information flow of a real application in a system, which comprises a first network element (101) and a second network element (102), as well as a packet network (103) between said first network element and said second network element. The method comprises transmitting a set of packets from the first network element (101) through the packet network (103) to the second network element (102). At the second network element, at least part of the transmitted packets are received. In a return transmission, a packet arrived at the second network element is transmitted back to the first network element only after a selected delay from the receiving of the packet at the second network element. The object of the invention is also a system, a network element and a computer program product implementing the method.

26 Claims, 3 Drawing Sheets

U.S. PATENT DOCUMENTS

| | | | | |
|---|---|---|---|---|
| 6,055,247 | A | 4/2000 | Kubota et al. | 370/508 |
| 6,577,648 | B1 * | 6/2003 | Raisanen et al. | 370/503 |
| 6,731,649 | B1 * | 5/2004 | Silverman | 370/466 |
| 7,010,595 | B2 * | 3/2006 | Wu | 709/224 |
| 7,016,340 | B1 * | 3/2006 | McKinion | 370/352 |

FOREIGN PATENT DOCUMENTS

| | | |
|---|---|---|
| EP | 1006689 | 6/2000 |
| WO | 0111854 | 2/2001 |

OTHER PUBLICATIONS

ITU-T G.711, "General Aspects of Digital Transmission Systems; Terminal Equipments; Pulse Code Modulation (PCM) of Voice Frequencies", ITU 1998, 1993, Fascicle III.4 of Blue Book.

ITU-T G.723.1, "General Aspects of Digital Transmission Systems; Dual Rate Speech Coder for Multimedia Communications Transmitting at 5.3 and 6.3 kbit/s", (Mar. 1996).

ITU-T H.323, "Series H: Audiovisual and Multimedia Systems; Infrastructure of Audiovisual Services—Systems and Terminal Equipment for Audiovisual Services; Packet-Based Multimedia Communications Systems", (Feb. 1998).

"Analysis of Audio Packet Loss in the Internet" by J. Bolot et al Proceedings of NOSSDAV '95, pp. 154-165.

"Estimation and Removal of Clock Skew from Network Delay Measurements" by S. Moon et al, in Proc. Infocom '99, IEEE New York, 1999.

Chinese Publication Internet, "The Design and Implementation of the Caller ID", 1998, pp. 13-17, English translation not available.

IPP VBR, Tsinghua Tongfang Optical Disc Co., Ltd., 1999, four page document, English translation not available.

* cited by examiner

EMULATING OF INFORMATION FLOW

BACKGROUND OF THE INVENTION

1. Technical Field

The present invention relates to the emulating of the two-way information flow of a real application. Particularly, but not necessarily, the invention relates to the emulating of the information flow of a VoIP (Voice over Internet Protocol) call for determining the Quality of Service (QoS) at a VoIP application level.

2. Discussion of Related Art

Traditionally, when calling by telephone speech has been transferred in circuit-switched networks, such as in a Public Switched Telephone Network (PSTN). When calling by telephone in a digital circuit-switched network, a permanent connection of 64 kbps (kilo bits per second) is set up for each call. The standard band of the connection, 64 kbps, is due to the bit rate required in the sampling of analog speech when using 8-bit Pulse Code Modulation (PCM) at a sampling frequency of 8 kHz, which procedure enables the transmitting of analog speech having a frequency of 300 to 3400 Hz in a digital format.

The digital telephone network described above that is presently in common use is, however, very ineffective and thus consumes a lot of network resources. In the telephone network, the band for a connection is also reserved when the connection is not used actively, i.e. neither party of the connection is transferring information, such as speech or data, along the connection. The kind of use of a static band consumes a lot of data transmission resources, and as a result of this additional capacity must be invested in as the number of users increases. The type of ineffectiveness described above causes problems especially in calls between continents, where increasing the data transmission capacity is not as easy as in other cases. The problem is also partly manifest in call prices; expensive investments in capacity must be covered by high user charges.

To compensate and supplement calls that use a static band reservation in a telephone network, so-called VoIP calls, i.e. IP calls have been started to be marketed. Typically, the information transmitted in an IP call, such as speech, voice and/or video, is first converted from an analog format into a digital format, then compressed and converted into IP packets that are conveyed over an IP-based packet-switched network, such as the Internet network, sharing the band with other IP traffic. In IP calls, a band can be used in a considerably more effective way than in calls that reserve a static band, which is also shown in call prices. In addition, also new more effective coding schemes can be used, such as e.g. G.723.1 coding.

The time of arrival of transmitted IP packets to a receiver is not known before the packets arrive. And because IP routes the information flow packet by packet the time of propagation of packets from a sender to a receiver may vary greatly and the order of the packets may change. Furthermore, packets may be lost, for example, as a result of the overflows of incoming data that take place in the buffers of routers. By using a reliable protocol over IP, for example, packet losses can be identified automatically at a protocol level and the lost packets can be retransmitted. One such protocol is TCP (Transmission Control Protocol).

However, the retransmissions in question would cause additional varying delay in the transmission of information over the IP network. And since several applications used in repeating speech and/or picture transferred in real time do not function flawlessly if, for example, too much delay occurs in the transmission of information, TCP is not well suited for use as a protocol to be used over IP in IP calls. Therefore, UDP (User Datagram protocol), where there are no retransmissions, is normally used in IP calls. Instead, in a call setup, the use of TCP is recommendable so that the call setup would take place as reliably as possible.

For example, just for the reason that the applications used in repeating realtime information transmitted over an IP network have high realtime requirements in order to function flawlessly, at least some kind of arrangement is needed to guarantee the desired Quality of Service (QoS) for the IP call in question. IP as such does not provide QoS support in a form that it would provide a guaranteed Quality of Service. However, several different techniques exist with which a guaranteed QoS can be provided in an IP network. These are, among others, DiffServ (Differentiated Services) and IntServ (Integrated Services) techniques. Irrespective of which QoS technique is used, it is important that the QoS can be measured in order to find out whether it is really possible to provide a guaranteed QoS for each IP call.

Usually, several QoS parameters are required to describe a QoS. Thus, it is appropriate to measure values for a set of different QoS parameters, which in connection with VoIP are, for example, the following: end-to-end delay, end-to-end delay jitter, packet losses and packet loss correlation. Of these, end-to-end delay means the time that it takes for an IP packet to pass through an IP network from a sender to a receiver. End-to-end delay can also be measured as a round trip measurement, whereupon the time that it takes for an IP packet to pass from a sender to a receiver and back is measured. End-to-end jitter can be denoted, for example, as a standard deviation or variance. Packet losses tell how many of the transmitted IP packets fail to be received on the receiving side, i.e. how many IP packets are lost on the way. As for the system performance, it is highly significant whether IP packets disappear or are lost one here and another there (no packet loss correlation) or whether several successive IP packets are lost (high packet loss correlation).

Figure 1:
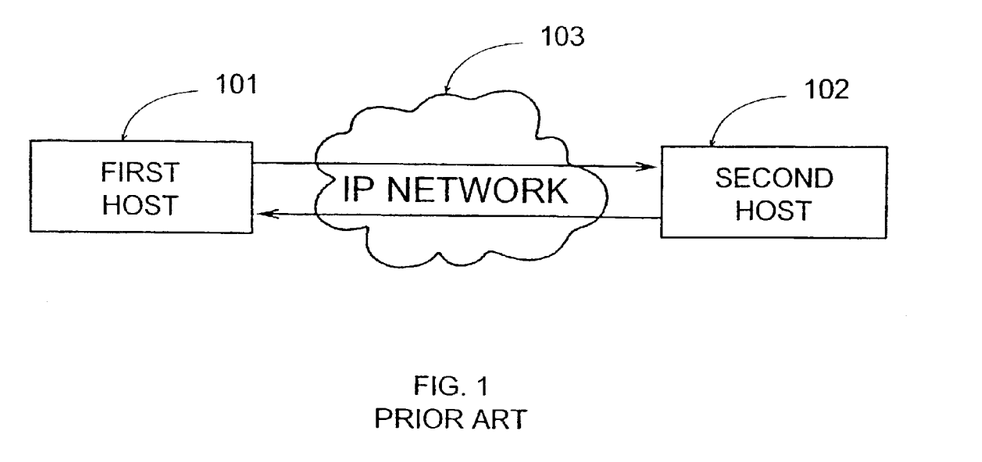
FIG. 1 shows the principle of one QoS measurement according to prior art.

FIG. 1 shows a principle of one QoS measurement according to prior art. There a stream of IP packets is transmitted from a first host 101 through an IP network 103 to a second host. Before transmitting, the first host 101 adds a first information to each IP packet to be transmitted. The stream of IP packets transmitted by the first host 101 is received at the second host 102, which adds a second information to the IP packets and returns them through the IP network 103 back to the first host 101, which adds a third information to the received IP packets.

Figure 2:
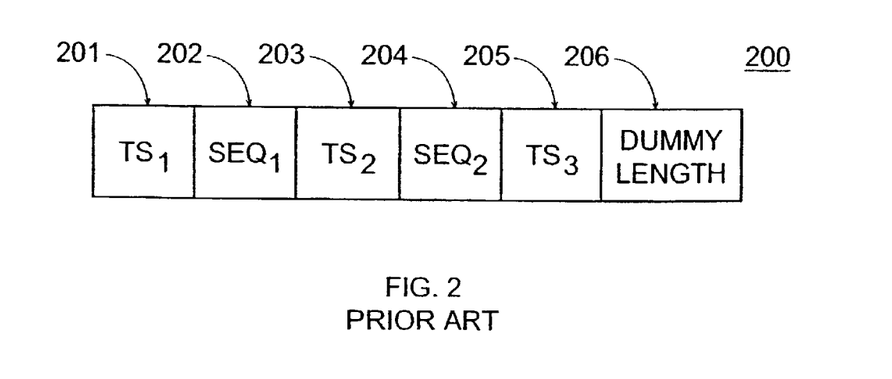
FIG. 2 shows the structure of an IP packet used in one QoS measurement according to prior art.

FIG. 2 illustrates the structure of an IP packet, the use of which is well known in the QoS measurement arrangement illustrated in FIG. 1. An IP packet 200 comprises various types of fields for storing the information added by hosts to the IP packet. For example, in fields 201 and 202, the first host 101 stores just before transmitting the IP packet as said first information a time stamp data $TS_1$ and a packet sequence number data $SEQ_1$ respectively. In fields 203 and 204, the second host 102 stores as said second information on receiving the IP packet a time stamp data $TS_2$ and a packet sequence number data $SEQ_2$ respectively. After receiving the IP packet, the second host 102 returns the IP packet immediately back to the first host 101 which stores, in a field 205, as said third information a time stamp data $TS_3$ on receiving the IP packet. Now, of the QoS parameters, e.g. end-to-end delay $d_{rt}$ can be determined by equation $$d_{rt} = TS_3 - TS_1.$$

In addition to the fields 201-205, the IP packet 200 in FIG. 2 comprises a dummy length 206. The dummy length 206 is a data portion of a specific length with which the length of the IP packet can be adapted to the size of the packets of a realistic codec, such as G.711. If the IP packets 200 are yet transmitted as such a typically uniform stream of IP packets as is formed by a realistic codec, a real IP call and its QoS measurements can be emulated by the arrangement presented above.

However, the arrangement according to prior art described above has its problems. Let us assume that a stream of IP packets 200 is sent from the first host 101 through the IP network 103 to the second host 102 and that the transmitting of the IP packets from the first host to the second takes place uniformly. In an ideal case, the time of transmission of all the IP packets (end-to-end delay) from the first host to the second is the same, whereupon the IP packets sent from the first host would also arrive at the second host uniformly. However, in reality, the situation is typically such that, for example, due to a varying IP network load IP packets do not arrive at the second host uniformly but burstily. By this is meant that the stream of IP packets arriving at the second host comprises densities (clusters of IP packets) and spacings (there is an exceptionally long pause between IP packets) instead of a steady stream.

When the second host now returns each IP packet it has received back to the first host, the stream of returned IP packets is already on leaving the second host bursty and not uniform as it would be in the case of a realistic IP call. In this case, the QoS experienced by the bursty stream of IP packets returning from the second host to the first host is normally worse than the QoS experienced by the stream of IP packets transmitted uniformly from the first host to the second host. This asymmetry is not characteristic of a real IP call and it distorts the measuring of the values of QoS parameters. Furthermore, if IP packets sent by the first host are lost on their way to the second host, the stream of IP packets returned from the second host to the first has less IP packets than in the original stream of IP packets sent from the first host to the second. In this case, additional spacings are automatically formed in the stream of IP packets returned from the second host to the first, which again increases asymmetry.

Thus, the measurement arrangement according to the prior art presented above is not suited in the best possible way for the QoS measurements of an IP call.

SUMMARY OF INVENTION

An object of the present invention is to provide a method, system, network element and computer program better suited for making QoS measurements of an IP call.

According to a first aspect of the invention, there is implemented a method for emulating the two-way information flow of a real application in a system, which comprises a first network element and a second network element, as well as a packet network between said first network element and said second network element, which method comprises:

transmitting a set of packets from the first network element through the packet network to the second network element;

receiving at least part of the transmitted packets at the second network element;

transmitting the received packets from the second network element through the packet network back to the first network element in response to the receiving of the packets at the second network element.

It is characteristic of the method that it comprises:

transmitting a packet arrived at the second network element back to the first network element only after a delay from the receiving of the packet at the second network element.

According to a second aspect of the invention, there is implemented a system for emulating the two-way information flow of a real application, which system comprises a first network element and a second network element, as well as a packet network between said first network element and said second network element, which first network element comprises:

means for transmitting a set of packets from the first network element through the packet network to the second network element, and the second network element comprises:

means for receiving at least part of the transmitted packets at the second network element;

means for transmitting the received packets from the second network element through the packet network back to the first network element in response to the receiving of the packets at the second network element.

It is characteristic of the system that the second network element further comprises:

means for transmitting a packet arrived at the second network element back to the first network element only after a delay from the receiving of the packet at the second network element.

According to a third aspect of the invention, there is implemented a network element for emulating the two-way information flow of a real application in a system, which in addition to said network element comprises a specific first network element and a packet network between the network element and said first network element, which network element comprises:

means receiving packets transmitted from said first network element through the packet network;

means for transmitting the received packets through the packet network back to the first network element in response to the receiving of the packets at the network element.

It is characteristic of the network element that the network element further comprises:

means for transmitting the received packets through the packet network back to the first network element in response to the receiving of the packets at the network element.

It is characteristic of the network element that the network element further comprises:

means for transmitting a packet arrived at the network element back to the first network element only after a delay from the receiving of the packet at the network element.

According to a fourth aspect of the invention, there is implemented a computer program product executable in a network element for emulating the information flow of a real application in a system, which in addition to said network element comprises a specific first network element and a packet network between the network element and said first network element, which computer program product comprises a program code:

for receiving at the network element packets transmitted from the first network element through the packet network;

for transmitting the received packets through the packet network back to the first network element in response to the receiving of the packets at the network element.

It is characteristic of the computer program product that the computer program product comprises a program code:

for transmitting a packet arrived at the network element back to the first network element only after a delay from the receiving of the packet at the network element.

In a preferred embodiment of the invention, said network elements are computers, such as PCs (Personal Computer), workstation computers or network server computers, and said packets are communication packets, such as IP packets. The present invention enables better emulating of the two-way information flow of a real application, such as the information flow of an IP call, at an application level with uniform streams of IP packets and signalling than is known from prior art and thus, the performing of more reliable QoS measurements than the known solutions. The invention can be used, among other things, in network designing and for testing the performance of a network from the viewpoint of VoIP.

By the term IP network is meant in this description besides networks based on IP, such as Internet and Intranet networks, also other similar packet networks, such as the X.25 network. By the IP call is meant a call where information, preferably speech, voice, video or multimedia, is transferred over this kind of network typically for implementing a realtime service. Thus, the invention can also be used for emulating a videoconference.

BRIEF DESCRIPTION OF THE DRAWINGS

In the following, the invention will be described in detail by referring to the enclosed drawings, in which.

DETAILED DESCRIPTION OF THE DRAWING

Figure 3:
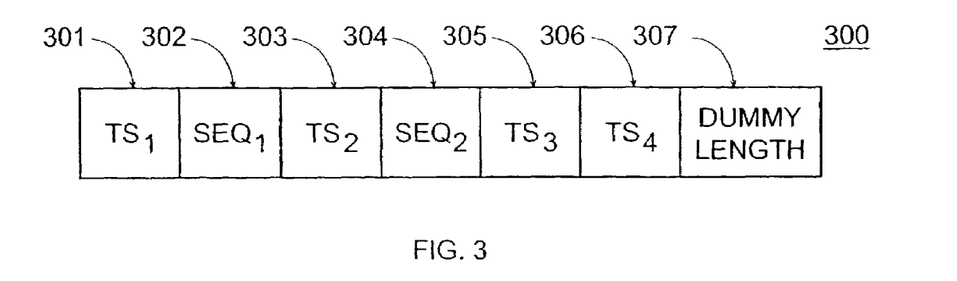
FIG. 3 illustrates the structure of an IP packet suitable for the implementation of one embodiment of the invention.

FIGS. 1 and 2 were already explained above in connection with the description of the prior art. Next, a preferred embodiment of the invention will be explained where an IP call between a first host and a second host is emulated and QoS measurements are performed. Roughly, FIG. 1 can also illustrate a measurement arrangement according to the invention. In a preferred embodiment of the invention, a first host 101 transmits through an IP network 103 to a second host 102 a similar uniform stream of IP packets as is formed by a realistic codec, such as G.711, where the size of the IP packets corresponds to the size of the packets formed by the real codec. The IP packets are preferably transmitted by using UDP over IP. FIG. 3 illustrates the structure of an IP packet, which is used in the preferred embodiment of the invention. An IP packet 300 comprises various types of fields for storing the information added by the hosts to each IP packet at specific moments of time. In fields 301 and 302 of each IP packet, the first host 101 stores as first information just before transmitting each IP packet 300 a time stamp data $TS_1$ and a packet sequence number data $SEQ_1$ respectively. For example, when transmitting a first IP packet the first host stores as the time stamp data of $TS_1$ of the IP packet in question the time of transmission of the IP packet in question and as the sequence number data $SEQ_1$, the number 1. Correspondingly as the time stamp data $TS_1$ of a second IP packet the transmitting time of the second IP packet is stored and as the sequence number $SEQ_1$, the number 2 and so on.

As the IP packets of the stream of IP packets arrive at the second host 102, the second host stores in fields 303 and 304 each IP packet as second information a time stamp data $TS_2$ and a packet sequence number data $SEQ_2$ respectively. When the first IP packet (which is not necessarily the IP packet the first host transmitted first) of the stream of IP packets arrives at the second host, the second host then stores the time of arrival of the IP packet in question at the second host as the time stamp data $TS_2$ of the IP packet in question and the number 1 as the sequence number data $SEQ_2$. Correspondingly, the time of arrival of the second IP packet at the second host is stored as the time stamp data $TS_2$ of the IP packet in question and the number 2 as the sequence number $SEQ_2$, and so on.

However, according to the invention, the IP packets arrived at the second host are not returned immediately to the first host, but they (or their data) are guided into a buffer at the second host from where they are then transmitted in the order of arrival back to the first host as a similar uniform stream of IP packets as is formed by a realistic codec used in an IP call. In this way, asymmetry can be eliminated in the transmitting of IP packets better than in solutions known from prior art. When transmitting each buffered IP packet back to the first host, the second host stores in a field 305 of each IP packet as third information a time stamp data $TS_3$. The transmitting time of each IP packet is stored as the time stamp data $TS_3$.

As the IP packets of the stream of IP packets returned from the second host to the first host arrive at the first host, the first host stores in a field 306 of each IP packet as fourth information a time stamp data $TS_4$. The time of arrival of each IP packet at the first host is stored as the time stamp data $TS_4$. Preferably, for indicating the sequence in which the IP packets return to the first host a new sequence number indicator (e.g. $SEQ_3$) is not required if the received IP packets (or the data comprised by them) are stored in the same sequence as they arrived at the first host. Naturally, using the sequence number indicator $SEQ_3$ in connection with the invention is possible however.

In addition to the fields 301-306, the IP packet 300 in FIG. 3 comprises a dummy length 307. The dummy length 307 is a data portion of a specific length which does not necessarily have any significance other than that with it the length of an IP packet can be adapted to the size of the packets of a realistic codec, such as G.711. In addition to the fields shown in FIG. 3, the IP packet 300 typically comprises IP and UDP headers, among other things, for the address information and port numbers of a sender and a receiver. The content of the fields 301-307 can be called by the term payload.

Now, of the QoS parameters, a round trip end-to-end delay $d_{rt}$ can be determined by the equation $d_{rt,new}=TS_4-TS_1-(TS_3-TS_2)$. If the clocks of the first and second hosts have been synchronised, one-way end-to-end delays can be calculated by using the equations $d_{ow,1}=TS_2-TS_1$ (the trip for the first host to the second) and $d_{ow,2}=TS_4-TS_3$ (the return trip from the second host to the first). In synchronising the hosts, e.g., GPS (Global Positioning System) can be used.

Material for calculating the end-to-end delay jitter is obtained, for example, by calculating the differences between the time stamps $TS_2$ of successive IP packets arrived at the second host. On the basis of the differences, for example, the standard deviation and/or variance of the end-to-end delay jitter (from the first host to the second host) can then be calculated.

Packet losses can be found out when the number of transmitted IP packets is known. In this case, when the stream of IP packets has gone the round trip between the first and second hosts, for example, the number of packets lost during the first part can be found out by subtracting the number of IP packets arrived at the second host from the number of packets transmitted.

Packet loss correlation (here from the first host to the second host) can be examined by studying the sequence numbers $SEQ_1$ of the IP packets received at the second host and by seeing which sequence numbers are missing.

Figure 4:
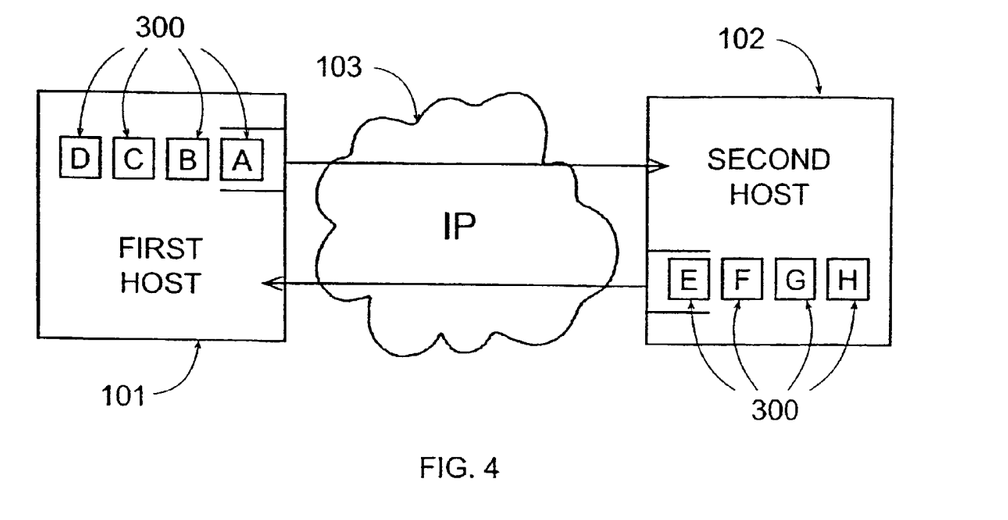
FIG. 4 shows an exemplary case with the help of which one embodiment of the invention is illustrated.
Figure 5:
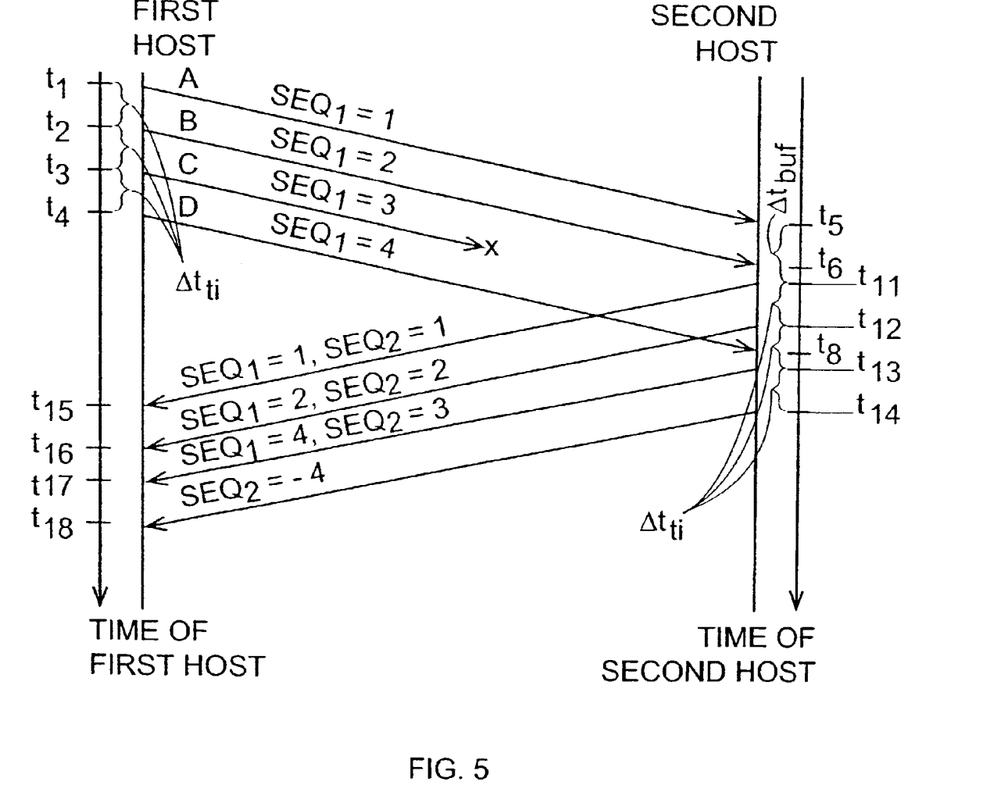
FIG. 5 is a diagram of a time domain illustrating the exemplary case shown in FIG. 4.

Next, the implementation of the preferred embodiment of the invention will be presented in more detail with the help of an exemplary case by referring to FIGS. 4 and 5 of which FIG. 4 shows the basic arrangement in the exemplary case and FIG. 5 is the diagram of a time domain for illustrating the exemplary case. In FIG. 5, the left time axis shows the time according to the clock of the first host and the right time axis shows the time according to the clock of the second host. The clocks of the first and second hosts can be synchronised with each other.

Let us assume that the number of IP packets to be transmitted N=4. In transmitting the IP packets, the transmitting interval of IP packets formed by a realistic codec, be it $\Delta t_{ti}$, is emulated. Prior to the QoS measurements, a message is sent from the first host to the second host, wherein the values of the parameters N, $\Delta_{ti}$ and a selected buffer delay $\Delta t_{buf}$ are indicated to the second host. It must be noted here that although for reasons of simplicity in this exemplary case the number of IP packets transmitted N=4, in reality the number of IP packets transmitted can be considerably higher, e.g., several hundreds or thousands.

Now, from the first host 101 to the second host 102 through the IP network 103 a stream of IP packets is transmitted where, in a first IP packet (packet A), the sequence number $SEQ_1=1$ and the time stamp $TS_1$ are stored just before the transmitting of the IP packet in question at the moment of time $t_1$, in a second IP packet (packet B), the sequence number $SEQ_1=2$ and the time stamp $TS_1$ are stored at the moment of time $t_2$, in a third IP packet (packet C), the sequence number $SEQ_1=3$ and the time stamp $TS_1$ are stored at the moment of time $t_3$, and in a fourth IP packet (packet D), the sequence number $SEQ_1=4$ and the time stamp $TS_1$ are stored at the moment of time $t_4$. The IP packets are transmitted at intervals of $\Delta t_{ti}$, whereupon $t_2-t_1=\Delta t_{ti}$, $t_3-t_2=\Delta t_{ti}$ and $t_4-t_3=\Delta t_{ti}$. Said moments of time $t_1$, $t_2$, $t_3$ and $t_4$ are according to the clock of the first host.

After getting the message from the first host, in which message the number of the IP packets transmitted N is indicated to be four, the second host stores in a specific (transmitting) buffer four IP packets the sequence numbers of which are $SEQ_2=-1$ (the first IP packet to be transmitted from the buffer (packet E)), $SEQ_2=-2$ (the second packet (packet F)), $SEQ_2=-3$ (the third packet (packet G)), $SEQ_2=-4$ (the fourth packet (packet H)).

After receiving, at the moment of time $t_5$, the first of the IP packets transmitted by the first host, which here is the IP packet (packet A) that was also transmitted first (this is not always the case, e.g. if the first IP packet is lost on the way), the second host stores in the IP packet in question (packet A) the time stamp $TS_2$ and stores as the sequence number $SEQ_2=1$. After this, the second host copies the time stamp and sequence number data ($TS_1$, $SEQ_1=1$, $TS_2$ and $SEQ_2=1$) of the IP packet in question (packet A) in the IP packet (packet E) that is in the buffer the first in turn to be transmitted whereupon, among other things, in the IP packet that is in the buffer the first in turn to be transmitted, the sequence number (packet E) $SEQ_2=-1$ is substituted by the number 1. The packet E is now transmitted from the second host to the first host after the buffer delay $\Delta t_{buf}$, at the moment of time $t_{11}=t_5+\Delta t_{buf}$. Just before transmitting, the second host stores, in the packet E, the time stamp $TS_3$. This takes place approximately at the moment of time $t_{11}$.

When the stream of IP packets to be returned has now begun, the other three IP packets (packets F, G and H) waiting to be transmitted in the buffer of the second host at intervals of $\Delta t_{ti}$ at the moments of time $t_{12}$ (packet F), $t_{13}$ (packet G), and $t_{14}$ (packet H), whereupon if for the packets E, F, G and H index numbers j=1, 2, 3, 4 respectively are used, the transmitting time $t_{1j}$ of each packet according to the clock of the second host is obtained from the equation $t_{1j}=t_5+\Delta t_{buf}+(j-1)\Delta t_{ti}$.

Correspondingly, when receiving some other (than the packet A described above) IP packet belonging to a stream of IP packets sent from the first host to the second host, the second host stores in the received packet the time stamp $TS_2$ and the sequence number $SEQ_2$, after which the second host copies the data of the received IP packet in such an IP packet in the transmitting buffer of the second host that is next in turn to be transmitted, wherein the data of some arrived IP packet has not yet been copied. Before transmitting each IP packet, the second host yet stores in each packet to be transmitted the time stamp $TS_3$. Thus, in the situation illustrated by FIGS. 4 and 5, after receiving the packet B the second host stores therein the time stamp $TS_2$ at the moment of time $t_6$ and the sequence number $SEQ_2=2$, because the packet B is the second IP packet that arrives at the second host. The data of the packet B are copied in the packet F waiting to be transmitted in the buffer whereupon, among other things, the sequence number of the packet F $SEQ_2=-2$ is substituted by the number 2. The packet F is transmitted at the moment of time $t_{12}$. Just before transmitting the time stamp $TS_3$ is stored in the packet F.

Next, a situation where a packet loss takes place will be examined in the exemplary case shown in FIGS. 4 and 5. Let us assume that the packet C disappears and fails to arrive at the second host. Because the buffer delay $\Delta t_{buf}$ in this case is so long that the packet (packet D) transmitted next nevertheless manages to arrive at the second host at the moment of time $t_8$, which is before the transmitting time of the packet G $t_{13}=t_5+\Delta t_{buf}+2\Delta t_{ti}$ (the packet G is the packet wherein the data of the packet C should be copied for return transmission), instead of the lost packet C the data of the packet D ($TS_1$, $SEQ_1=4$, $TS_2$ and $SEQ_2=3$) are copied in the packet G whereupon, among other things, the sequence number of the packet G $SEQ_2=-3$ is substituted by the number 3. The packet G is transmitted at the moment of time $t_{13}$. The time stamp $TS_3$ is stored in the packet G just before transmitting.

Because the packet C failed to arrive at the second host, there is no such IP packet arrived at the second host from which data would not already have been copied in some packet, whereupon there is nothing to copy in the packet H. In order that a uniform stream of IP packets could be maintained, the packet H is nevertheless transmitted as a so-called dummy packet (filling packet) at the moment of time of transmission $t_{14}$, although it does not now comprise values based on real time stamp and sequence number data for $TS_1$, $SEQ_1$ and $TS_2$. Before transmitting the time stamp $TS_3$ is stored in the packet H. Since a new sequence number $SEQ_2$ was not copied in the packet H either, the original negative sequence number $SEQ_2=-4$ remains as the sequence number of the packet H.

When the packets E, F, G and H arrive at the first host at the moments of time $t_{15}$, $t_{16}$, $t_{17}$ and $t_{18}$ respectively, the first host stores therein the time stamps $TS_4$. For the QoS parameters, values can now be determined as was already described above. If the sequence number of some received IP packet $SEQ_2$ is negative, the first host will identify it as a dummy packet, whereupon it does not take into account the information possibly found in the fields 301 ($TS_1$), 302 ($SEQ_1$) and/or 303 ($TS_2$) of the dummy packet, because this information is not based on real time stamp or sequence number data. The existence of dummy packets in the returned steam of IP packets normally means that at least one of the IP packets originally transmitted from the first host to the second has failed to arrive at the second host or has arrived there too late. In the invention, however, error situations like this have been taken into consideration in the manner presented above (e.g. by the use of dummy packets), and the emulating of a realistic IP call and the QoS measurements will succeed even if packet losses occured.

In an IP call, where realtime speech is transferred, there normally occur talkspurts and silent periods (pauses). This is due to the fact than when one part of the IP call speaks, the other party normally is silent. For some VoIP terminals (wireless terminal, telephones), VAD (Voice Activity Detection) detectors have been developed, which operate so that when the level of a speech signal coming into the VAD detector falls below a specific limit (speaker is silent), IP packets will no longer be transmitted to the receiving end. In this case, data transmission band is saved.

Next, the description of the invention will be supplemented by presenting how for performing QoS measurements an IP call is emulated according to the invention, the parties of which have a VAD function in their VoIP terminals. IP packets are now transmitted from the first host to the second host still at intervals of $\Delta t_{ti}$, but when an amount of $N_{ts}$ IP packets have been transmitted, a pause is made in the transmitting of IP packets that will last for a period of $N_{sp}\Delta t_{ti}$. After this, a new value is allotted for $N_{ts}$ and IP packets are transmitted for a period of $N_{ts}\Delta t_{ti}$. Then, a new value is allotted for $N_{sp}$ and a pause is again made in the transmitting of IP packets for a period of $N_{sp}\Delta t_{ti}$ and so on. The figures $N_{ts}$ and $N_{sp}$ are allotted from random distribution functions $P(N_{ts})$ and $P(N_{sp})$ respectively, of which $P(N_{ts})$ emulates the distribution of the lengths of talkspurts and $P(N_{sp})$ the distribution of the lengths of silent periods in a real IP call. The material for forming the distributions $P(N_{ts})$ and $P(N_{sp})$ has been obtained, for example, by measuring lengths of talkspurts and pauses in real IP calls.

In practice, the values of $N_{ts}$ and $N_{sp}$ can be allotted for each talkspurt and silent period independently irrespective of each other in the first and second hosts. And since the information about the number N of the packets transmitted has already before the commencement of QoS measurements been delivered from the first host to the second, the total number of IP packets transmitted in both directions will tally. Alternatively, the values of $N_{ts}$ and $N_{sp}$ can only be allotted in the first host, in which case the transmission of IP packets returned by the second host to the first host can be timed for a time period when IP packets are not arriving at the second host. So here the second host "is listening" whether IP packets are coming in and, if they are not, the second host starts the returning of the IP packets that are in the buffer, to the first host. In practice, "listening" can be implemented, for example, so that if IP packets have not arrived at the second host within a specific time (e.g. buffer delay $\Delta t_{buf}$), the second host concludes that the first host has a silent period going, whereupon it starts the returning of IP packets to the first host.

This description has above concentrated on describing the emulating of an IP call and the performing of the QoS measurements of the IP call. Because, in a real IP call, UDP is used where no retransmissions and acknowledgements are used, naturally these do not occur in the description of the invention either. However, in an IP call setup, a reliable protocol must be used, whereupon the retransmissions and acknowledgements of packets become of interest. Well-known VoIP signalling protocols are, among others, H.323 and SIP (Session Initiation Protocol). Signalling protocols enable in a call setup, for example, the fact that a VoIP terminal (first host) that is making an IP call and a VoIP terminal (second host) that answers the IP call can communicate to each other what type of codec each of the call party has in its use. For example, in H.323, most of the signalling used in a call setup takes place by using a reliable protocol, TCP. According to the invention, the setting up of an IP call is emulated by sending one or more IP packets from the first host to the second, depending on the signalling protocol to be emulated. Said IP packet used for emulating the call setup is otherwise similar to the IP packet 300 described above, but instead of the UDP-header it comprises a TCP header. Thus, in emulating a call setup, IP packets are preferably transmitted by using TCP over IP. A TCP header typically comprises, among other things, information that can be used in retransmitting lost IP packets.

In emulating a call setup, always after receiving an IP packet transmitted by the first host the second host immediately transmits the same IP packet back to the first host. Now, the call setup time can be measured, which is the time that is consumed from the transmitting of the first IP packet to the receiving of the last IP packet at the first host. Alternatively, it is possible to transmit from the first host only one IP packet and wait for it to return from the second host. When the returned IP packet is received at the first host, the call setup time can now be approximated by multiplying the time between the transmitting of the IP packet and the receiving of the returned IP packet, e.g. by some number suitable for the purpose. In determining the call setup time, the time stamps $TS_2$ and $TS_3$ are not necessarily needed at all, because the IP packet is transmitted back immediately after arriving at the second host. The time between the transmitting of the IP packet and the receiving of the returned IP packet is obtained by subtracting the time stamp $TS_1$ from the time stamp $TS_4$.

Naturally, the actual emulating of an IP call and the QoS measurements of the IP call will be commenced only after the emulating of signalling related to the call setup has been completed.

Figure 6:
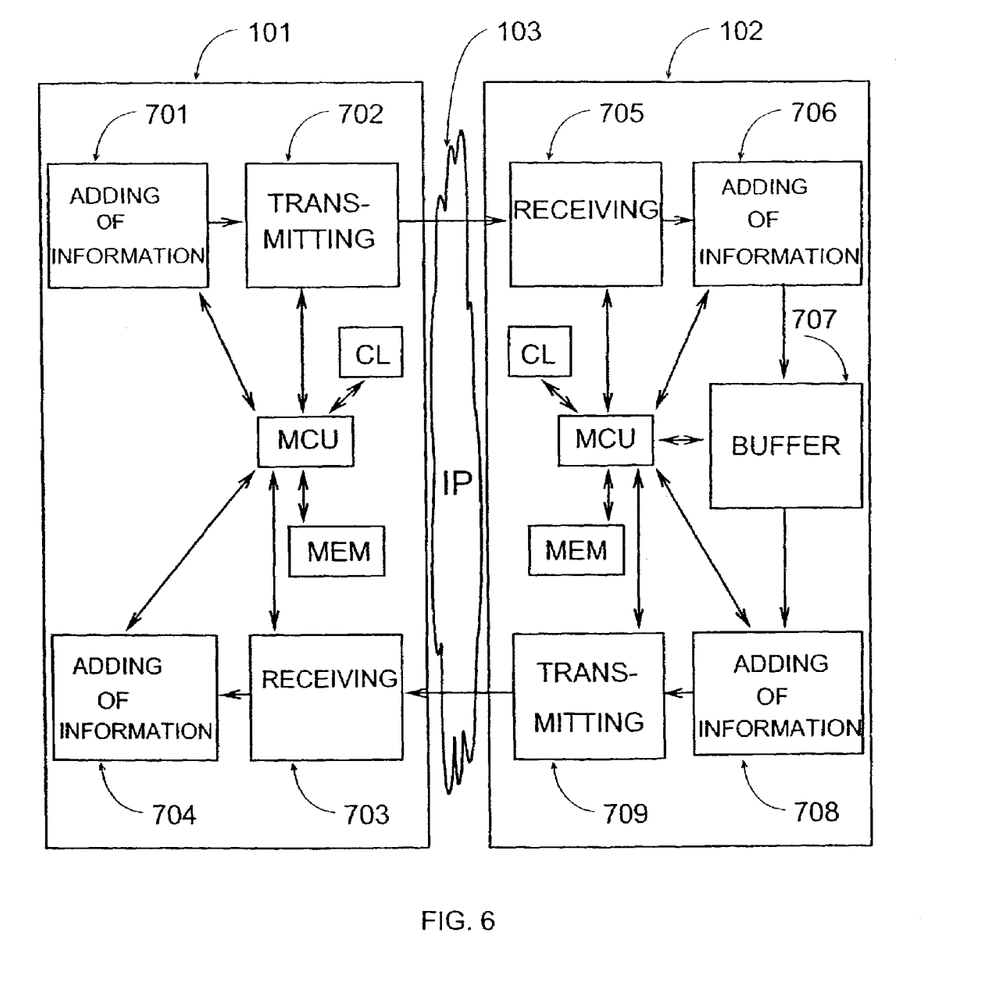
FIG. 6 illustrates hardware for implementing the invention.

FIG. 6 shows hardware suitable for implementing the invention. The hardware comprises a first host 101 and a second host 102, as well as an IP network 103 between the hosts. The hosts can be, e.g. PCs that can be coupled to the IP network 103, for example, with a network access card (not shown in the figure). The first and second hosts comprise a unit MCU (Master Controlling Unit) that controls the host, as well as a memory MEM. The MCU can be, e.g. a microprocessor. Blocks 701-709 are functional blocks, wherein the MCU is arranged to carry out specific activities on the basis of a program stored in the MEM of the host. In the block 701, a time stamp data $TS_1$ is stored in the IP packets to be transmitted according to a clock CL of the first host just before transmitting, and a sequence number data $SEQ_1$. In the block 702, the IP packets are transmitted to the second host 102 through the IP network 103. In the block 705, the second host 102 receives the IP packets transmitted by the first host 101, wherein, in the block 706, a time stamp data $TS_2$ is stored according to the clock CL of the system and a sequence number data $SEQ_2$. In the block 707, the time stamp and sequence number data of the received IP packets $TS_1$, $SEQ_1$, $TS_2$ and $SEQ_2$ are copied in the IP packets waiting to be transmitted in a buffer. In the block 708, a time stamp data $TS_3$ is stored in the IP packets to be transmitted to the first host according to the clock CL of the second host just before transmitting. In the block 709, the IP packets are transmitted to the first host 101 through the IP network 103. In the block 703, the first host receives the IP packets transmitted by the second host 102 wherein, in the block 704, a time stamp data $TS_4$ is stored according to the clock CL of the first host.

In practice, in the memory MEM of the hosts, there is a storage area wherein the MCU typically stores the content of each IP packet to be transmitted (time stamp and sequence number data). Thus, in transmitting an IP packet it is just this content of the storage area that is sent to the receiving end. By said storage area is meant, for example, the buffer in the second host mentioned above, wherein the IP packets are waiting to be transmitted to the first host. At the receiving end, the MCU stores the data of the received IP packets in its memory MEM, in a file, for a later analysis, such as for calculating the QoS parameters.

Thus, the essential parts of the invention can be implemented programmably. The computer program products in question stored in the memories MEM of the hosts can be programmed in a programming language suitable for the purpose, such as C programming language.

Because the invention provides means for emulating more accurately a realistic IP call at an application level with signalling and symmetric uniform IP packet streams than is known from solutions according to prior art, the invention enables the carrying out of the QoS measurements of an IP call more reliably than the known solutions. In the arrangement according to the invention, error situations of an IP network are also prepared for, whereupon with the arrangement according to the invention reliable QoS measurements can also be carried out when IP packets of an IP call are lost along the way or when they arrive at the receiving end too late.

Although above, in the description of the invention, an arrangement was described which comprises two hosts and a packet network between them, there can also be more hosts. Thus, from a first host a stream of IP packets can be transmitted to two or more second hosts, which will all return the IP packets transmitted by the first host. For example, in this way, it is possible to emulate an IP group call, which is made from one VoIP terminal to two or more VoIP terminals and carry out the QoS measurements. Furthermore, according to the invention, it is possible to emulate more than one IP call simultaneously or nonsimultaneously and thus, carry out the QoS measurements using several different pairs of hosts.

This description presents the implementation and embodiments of the present invention, with the help of examples. For a person skilled in the it is apparent that the present invention is not restricted to details of the embodiments presented above, and that the invention can also be implemented in another form without deviating from the characteristics of the invention. The embodiments presented above should be considered illustrative, but not restricting. Thus, the possibilities of implementing and using the invention are only restricted by the enclosed claims. Consequently, the various options of implementing the invention as determined by the claims, including the equivalent implementations, also belong to the scope of the invention.

The invention claimed is:

1. A method comprising:
   transmitting a set of packets from the first network element through the packet network to the second network element;
   receiving at least part of the transmitted packets at the second network element;
   transmitting the received packets from the second network element through the packet network back to the first network element in response to the receiving of the packets at the second network element, wherein the method further comprises:
   transmitting each one of said transmitted packets arrived at the second network element in a return transmission back to the first network element only after a delay from the receiving of the packet at the second network element;
   storing in each one of said transmitted packets from the first network element, in connection with the transmitting of the packet, a first time information and a first sequence number data;
   storing in each one of said received packets at the second network element, in connection with the receiving of the packet, a second time information and a second sequence number data;
   further storing at the second network element in each of said received packets to be returned to the first network element, in connection with the return transmission of the packet, a third time information;
   storing at the first network element in each of said packets returned to the first network element, in connection with the receiving of the returned packets, a fourth time information; and
   determining on the basis of said time information and sequence number data values for a set of parameters describing quality of service for determining the quality of service.

2. A method according to claim 1, wherein the method further comprises the steps of:
   transmitting said set of packets from the first network element through the packet network to the second network element as a uniform stream of packets; and
   in response to the receiving of the packets at the second network element, transmitting the received packets to the first network element as a uniform stream of packets emulating a real internet protocol call at an application level for determining the quality of service.

3. A method according to claim 1, wherein, in the method, the packets transmitted are internet protocol packets that correspond in size to internet protocol packets transmitted in a real Internet protocol call.

4. A method according to claim 1, wherein, in transmitting a packet, user datagram protocol over internet protocol is used.

5. A method according to claim 1, wherein said network elements are computers.

6. A method according to claim 1, wherein the method comprises for emulating a group call, the step of transmitting from the first network element through the packet network a set of packets to a set of second network elements, which, in response to the receiving of the packets, return the packets they have received back to the first network element.

7. A method according to claim 1, wherein the method comprises using more than one network element pair, formed by the first and second network elements, for emulating more than one internet protocol call.

8. A method according to claim 1, wherein the method comprises emulating the call setup of an Internet protocol call by transmitting before transmitting said set of packets at least one packet from the first network element through the packet network to the second network element and by returning said at least one packet back to the first network element immediately after it has arrived at said second network element.

9. A method according to claim 8, wherein, in transmitting said at least one packet, transmission control protocol over internet protocol is used.

10. A method according to claim 1, wherein when the second network element is about to return the packets it has received from the first network element in a case, where the second network element lacks the packet to be returned, a filling packet is transmitted from the second network element to the first network element for maintaining a uniform stream of packets.

11. A method according to claim 1, wherein the method comprises transmitting first said set of packets from the first network element through the packet network to the second network element, after which a pause of a specific length is made in the transmitting of the packets, after which pause a second set of packets is transmitted from the first network element through the packet network to the second network element for emulating the talkspurts and silence periods of an internet protocol call.

12. A system comprising:
 a first transmitter for transmitting a set of packets from a first network element through the packet network to the second network element, and the second network element comprises:
 a receiver for receiving at least part of the transmitted packets at the second network element;
 a second transmitter for transmitting the received packets from the second network element through the packet network back to the first network element in response to the receiving of the packets at the second network element, wherein the second transmitter is for transmitting each of said received packets arrived at the second network element in a return transmission back to the first network element only after a delay from the receiving of the packet at the second network element, said second network element further comprising a memory for storing each one of said received packets arrived at the second network element from the first network element having a first time information and a first sequence number data for return to the first network element in connection with the return transmission of the received packets with a second time information indicator of a time of receipt at the second network element and with a third time information indicative of a time of transmission from the second network element and a second sequence number data for storage in the first network element along with a fourth time information indicative of a time of reception by the first network element so that, based on a determination from said time information and sequence number data, values for a set of parameters describing quality of service are obtained for determining quality of service.

13. A system according to claim 12, wherein the system is configured to emulate the two-way information flow of an internet protocol call for determining the quality of service.

14. A network element comprising:
 a receiver for receiving packets transmitted from a first network element through a packet network;
 a transmitter for transmitting the received packets through the packet network back to the first network element in response to the receiving of the packets at the network element and for transmitting each one of said received packets arrived at the network element in a return transmission back to the first network element only after a delay from the receiving of the packets at the network element, said network element further comprising a memory for storing each one of said packets received from the first network element having a first time information and a first sequence number data for return to the first network element in connection with the return transmission of the packets with a second time information indicative of a time of receipt of the packet and with a third time information indicative of a time of the return transmission and a second sequence number data for storage in the first network element along with a fourth time information indicative of a time of reception of the return transmission by the first network element so that, based on a determination from said time information and sequence number data, values for a set of parameters describing quality of service are obtained for determining quality of service.

15. A network element according to claim 14, wherein the network element—arranged to emulate the information flow of an internet protocol call for determining quality of service.

16. A computer program stored on a computer readable medium executable in the network element comprising program code:
 for receiving packets transmitted from a first network element through a packet network;
 for transmitting the received packets through the packet network back to the first network element in response to the receiving of the packets at the network element, wherein the computer program product comprises a program code:
 for transmitting each one of said received packets arrived at the network element in a return transmission back to the first network element only after a delay from the receiving of the packets at the network element, said network element further comprising a memory for storing each one of said packets received from the first network element having a first time information and a first sequence number data for return to the first network element in connection with the return transmission of the packets with a second time information indicative of a time of receipt of a second network element and with a third time information indicative of a time of the return transmission from the second network and a second sequence number data for storage in the first network element along with a fourth time information indicative of a time of reception of the return transmission by the first network element so that, based on a determination from said time information and sequence number data, values for a set of parameters describing quality of service are obtained for determining quality of service.

17. A computer program product according to claim 16, wherein the computer program product is arranged to emulate the information flow of an internet protocol call for determining Quality of Service.

18. A network element comprising:
a transmitter for transmitting a set of packets from said network element through a packet network to a second network element; and
a receiver for receiving back at least one of said transmitted packets as a returned packet in a return transmission from said second network element through the packet network after receipt at the second network element of one or more of said set of transmitted after a delay from the receiving of the packets at the second network element, wherein each packet of said set of packets sent from the transmitted network element includes a first time information and a first sequence number data for use in the second network element in storing a second time information indicator and a second sequence number data and for storing at the second network element in said returned packet, a third time information, wherein said network element further comprises a memory for storing with each returned packet a fourth time information and determining on the basis of said time information and sequence number data values a set of parameters describing quality of service.

19. A network element according to claim 18, wherein the packets transmitted are internet protocol packets that correspond in size to internet protocol packets transmitted in a real internet protocol call.

20. A network element according to claim 18, wherein the network element is configured to use user datagram protocol over internet protocol or transmission control protocol over internet protocol in transmitting a packet.

21. A network element according to claim 18, wherein the network element is configured to transmit first said set of packets from the first network element through the packet network to the second network element, and thereafter, to make a pause in the transmitting of the packets, and thereafter, to transmit a second set of packets from the first network element through the packet network to the second network element for emulating talkspurts and silence periods of an internet protocol call.

22. A network element according to claim 14, wherein the packets transmitted are internet protocol packets that correspond in size to internet protocol packets transmitted in a real internet protocol call.

23. A network element according to claim 14, wherein the network element is configured to use user datagram protocol over internet protocol or transmission control protocol over internet protocol in transmitting a packet.

24. A network element according to claim 14, wherein the network element is configured to transmit a filling packet to the first network element for maintaining a uniform stream of packets in a case, where the network element lacks the packet to be returned to the first network element.

25. A network element according to claim 14, wherein the network element comprises a buffer configured to produce said delay in transmission.

26. A method comprising
receiving at a second network element packets transmitted from a first network element through a packet network,
transmitting the received packets from the second network element through the packet network in a return transmission back to the first network element in response to the receiving of the packets at the second network element, wherein the method further comprises:
transmitting each one of said packets received at the second network element back to the first network element only after a delay from the receiving of the packet at the second network, and
storing each one of said packets received from the first network element having a first time information and a first sequence number data for return to the first network element in connection with the return transmission of the packet with a second time information, a second sequence number data, and a third time information for storage in the first network element along with a fourth time information so that, based on the time information and sequence number data, values for a set of parameters describing quality of service are obtained for determining quality of service.

* * * * *

UNITED STATES PATENT AND TRADEMARK OFFICE
CERTIFICATE OF CORRECTION

PATENT NO.        : 7,274,714 B2
APPLICATION NO.   : 10/204107
DATED             : September 25, 2007
INVENTOR(S)       : Räisänen et al.

It is certified that error appears in the above-identified patent and that said Letters Patent is hereby corrected as shown below:

1. In column 12, line 7, claim 1, line 1, "A method comprising:" should be --A method, comprising:--.
2. In column 12, line 8, claim 1, line 2, "from the first" should be --from a first--.
3. In column 12, line 9, claim 1, line 3, "through the packet network to the second" should be --through a packet network to a second--.
4. In column 12, line 56, claim 3, line 4, "Internet" should be --internet--.
   In column 13, line 6, claim 8, line 2, "Internet" should be --internet--.
5. In column 13, line 34, claim 12, line 2, "through the packet network to the" should be --through a packet network to a--.
6. In column 14, line 21, claim 14, line 18, "packet and with a third" should be --packet with a third--.
7. In column 14, line 31, claim 15, line 2, "element –" should be --element is--.
8. In column 14, line 34, claim 16, line 1, delete "program stored on" and insert --readable medium encoded with--.
9. In column 14, lines 34 and 35, claim 16, lines 1 and 2, delete "readable medium" and insert --program--.
10. In column 14, line 37, claim 16, line 4, after "receiving" insert --at a network element--.
11. In column 14, line 38, claim 16, line 5, "a" should be --the--.
12. In column 14, line 47, claim 16, line 14, "packets" should be --packet--.
13. In column 14, lines 65 and 66, claim 17, lines 1 and 2, "product" should be deleted.
14. In column 15, line 3, claim 18, line 1, "element comprising" should be --element, comprising--.
15. In column 15, line 11, claim 18, line 9, after "transmitted" --packets-- should be inserted.
16. In column 15, line 17, claim 18, line 15, "information indicator" should be --indicator--.
17. In column 16, line 17, claim 26, line 1, "method comprising" should be --method, comprising--.
18. In column 16, line 29, claim 26, line 13, "second network" should be --second network element--.

UNITED STATES PATENT AND TRADEMARK OFFICE
CERTIFICATE OF CORRECTION

PATENT NO.       : 7,274,714 B2
APPLICATION NO.  : 10/204107
DATED            : September 25, 2007
INVENTOR(S)      : Räisänen et al.

It is certified that error appears in the above-identified patent and that said Letters Patent is hereby corrected as shown below:

19. In column 16, line 37, claim 26, line 21, "based on the" should be --based on a determination from said--.

Signed and Sealed this

Eleventh Day of November, 2008

JON W. DUDAS
*Director of the United States Patent and Trademark Office*